United States Patent
McQuerrey

(10) Patent No.: US 12,539,532 B2
(45) Date of Patent: Feb. 3, 2026

(54) COMBINING WET PAPER AND PLASTIC TO A CONTROLLED DRY WEIGHT RATIO

(71) Applicant: Continuus Materials Intellectual Property, LLC, The Woodlands, TX (US)

(72) Inventor: Brian McQuerrey, Sarasota, FL (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 568 days.

(21) Appl. No.: 18/192,125

(22) Filed: Mar. 29, 2023

(65) Prior Publication Data

US 2024/0066575 A1    Feb. 29, 2024

Related U.S. Application Data

(60) Provisional application No. 63/401,887, filed on Aug. 29, 2022.

(51) Int. Cl.
*B09B 3/50* (2022.01)
*B01F 23/60* (2022.01)
(Continued)

(52) U.S. Cl.
CPC ............... *B09B 3/50* (2022.01); *B01F 23/69* (2022.01); *B01F 23/704* (2022.01); *B07B 13/16* (2013.01);
(Continued)

(58) Field of Classification Search
CPC ......... B09B 3/50; B09B 3/32; B09B 2101/75; B09B 2101/85; B01F 23/69; B01F 23/704;
(Continued)

(56) References Cited

U.S. PATENT DOCUMENTS 8,444,897 B2 * 5/2013 Reaveley ............ B29B 17/0026
44/589
2001/0045518 A1 * 11/2001 Sommer, Jr. .......... B07C 5/3416
209/524

(Continued)

FOREIGN PATENT DOCUMENTS

JP         2003327983 A  * 11/2003
WO    WO-2019094411 A2 *  5/2019  ............... B03B 9/06

*Primary Examiner* — Edelmira Bosques
*Assistant Examiner* — Bao D Nguyen
(74) *Attorney, Agent, or Firm* — FOLEY & LARDNER LLP

(57) ABSTRACT

A method may include determining a first dry mass flow rate of a wet paper material stream based on a first amount of contaminants, a first moisture content, and a first wet mass flow rate of the wet paper material stream, determining a second dry mass flow rate of a wet plastic material stream based on a second amount of contaminants, a second moisture content, and a second wet mass flow rate of the wet plastic material stream, calculating, using the first dry mass flow rate and the second dry mass flow rate, a paper/plastic ratio of a combined stream of the paper material stream and the plastic material stream, and adjusting, a flow rate of paper into the paper material stream and a flow rate of plastic into the plastic material stream such that the calculated paper/plastic ratio of the combined stream equals a target paper/plastic ratio.

20 Claims, 3 Drawing Sheets

(51) Int. Cl.
  *B01F 23/70*   (2022.01)
  *B07B 13/16*   (2006.01)
  *B09B 3/32*    (2022.01)
  *B09B 101/75*  (2022.01)
  *B09B 101/85*  (2022.01)

(52) U.S. Cl.
  CPC ........ *B09B 3/32* (2022.01); *B01F 2215/0409* (2013.01); *B01F 2215/045* (2013.01); *B09B 2101/75* (2022.01); *B09B 2101/85* (2022.01)

(58) Field of Classification Search
  CPC ....... B01F 2215/0409; B01F 2215/045; B07B 13/16
  See application file for complete search history.

(56) References Cited

U.S. PATENT DOCUMENTS

| | | | |
|---|---|---|---|
| 2012/0190102 A1* | 7/2012 | Gitschel | C12P 3/00 |
| | | | 435/267 |
| 2012/0229796 A1* | 9/2012 | Priore | G01N 21/3563 |
| | | | 250/341.1 |
| 2017/0253891 A1* | 9/2017 | Gitschel | B02C 23/14 |
| 2018/0037830 A1* | 2/2018 | Bohlig | C22B 1/24 |
| 2019/0118157 A1* | 4/2019 | Chandran | C10J 3/721 |
| 2020/0316661 A1* | 10/2020 | Gitschel | B09B 3/00 |
| 2020/0338789 A1* | 10/2020 | Whitaker | B29B 17/02 |
| 2021/0276226 A1* | 9/2021 | Campbell | G05B 13/0265 |
| 2021/0390518 A1 | 12/2021 | Cochrane et al. | |

* cited by examiner

COMBINING WET PAPER AND PLASTIC TO A CONTROLLED DRY WEIGHT RATIO

CROSS-REFERENCE TO RELATED PATENT APPLICATION

This application claims the benefit under 35 U.S.C. § 119(e) of U.S. provisional application No. 63/401,887, entitled "COMBINING WET PAPER AND PLASTIC TO A CONTROLLED DRY WEIGHT RATIO," filed Aug. 29, 2022, which is incorporated herein by reference in its entirety.

BACKGROUND

Products made from recycled goods are often made using materials that are harvested from waste materials, sorted, washed, dried, and treated to produce pure base materials with which to manufacture products. Products made from recycled paper and plastic generally require a specific ratio of paper and plastic.

SUMMARY

Aspects of the present disclosure relate to a method including receiving, by a controller, from a first near-infrared (NIR) device, a first amount of contaminants in a wet paper material stream harvested from solid waste, receiving, by the controller, from the first NIR device, a first moisture content of the wet paper material stream, and calculating, by the controller, a first dry mass flow rate of the wet paper material stream based on the first amount of contaminants, the first moisture content, and a first wet mass flow rate of the wet paper material stream. The method may also include receiving, by the controller, from a second NIR device, a second amount of contaminants in a wet plastic material stream harvested from solid waste, receiving, by the controller, from the second NIR device, a second moisture content of the wet plastic material stream, and calculating, by the controller, a second dry mass flow rate of the wet plastic material stream based on the second amount of contaminants, the second moisture content, and a second wet mass flow rate of the wet plastic material stream. The method may also include calculating, by the controller, using the first dry mass flow rate and the second dry mass flow rate, a paper/plastic ratio of a combined stream of the paper material stream and the plastic material stream, and adjusting, by the controller, a flow rate of paper into the paper material stream and a flow rate of plastic into the plastic material stream such that the calculated paper/plastic ratio of the combined stream equals a target paper/plastic ratio.

The method may include sorting the combined stream to remove contaminants from the combined stream.

The method may include drying the combined stream.

The method may include incorporating the combined stream into a finished product having the target paper/plastic ratio.

The method may include determining, by the controller, a target moisture content of the combined stream, and wherein drying the combined stream comprises drying the combined stream to achieve the target moisture content.

The method may include determining, using the first NIR device, a first amount of plastic in the wet paper material stream, determining, using the second NIR device, a second amount of paper in the wet plastic material stream, and calculating the paper/plastic ratio of the combined stream by calculating the paper/plastic ratio of the combined stream using the first dry mass flow rate, the second dry mass flow rate, the first amount of paper, and the second amount of paper.

The method may include determining, using the first NIR device, a first type of paper in the wet paper material stream, determining, using the second NIR device, a second type of plastic in the wet plastic material stream, and modifying the target paper/plastic ratio based on the first type of paper and the second type of plastic.

The method may include determining, using the first NIR device, a first type of contaminants in the contaminants.

The method may include incorporating the combined stream into a finished product and modifying the target paper/plastic ratio based on one or more target attributes of the finished product.

The method may include determining the first type of paper using the first NIR device by identifying, by the first NIR device, a first spectral signature of the first type of paper in a spectrum spanning infrared and visible wavelengths, and determining the second type of paper using the second NIR device by, identifying, by the second NIR device, a second spectral signature of the second type of plastic in the spectrum spanning the infrared and visible wavelengths.

Aspects of the disclosure relate to a system including a controller which may receive, from a first near-infrared (NIR) device, a first amount of contaminants in a wet paper material stream harvested from solid waste, receive, from the first NIR device, a first moisture content of the wet paper material stream, and calculate a first dry mass flow rate of the wet paper material stream based on the first amount of contaminants, the first moisture content, and a first wet mass flow rate of the wet paper material stream. The controller may also receive, from a second NIR device, a second amount of contaminants in a wet plastic material stream harvested from solid waste, receive, from the second NIR device, a second moisture content of the wet plastic material stream, and calculate a second dry mass flow rate of the wet plastic material stream based on the second amount of contaminants, the second moisture content, and a second wet mass flow rate of the wet plastic material stream. The controller may also calculate, using the first dry mass flow rate and the second dry mass flow rate, a paper/plastic ratio of a combined stream of the paper material stream and the plastic material stream, and adjust the first wet mass flow rate of the paper material stream and the second wet mass flow rate of the plastic material stream such that the calculated paper/plastic ratio of the combined stream equals a target paper/plastic ratio.

The system a sorter to sort the combined stream to remove contaminants from the combined stream.

The system may include a dryer to dry the combined stream.

The system may include a press to incorporate the combined stream into a finished product having the target paper/plastic ratio.

The system may be such that the controller can determine a target moisture content of the combined stream, and the dryer dries the combined stream to achieve the target moisture content.

The system may be such that the controller can receive, from the first NIR device, a first amount of plastic in the wet paper material stream, receive, from the second NIR device, a second amount of paper in the wet plastic material stream, and calculate the paper/plastic ratio of the combined stream using the first dry mass flow rate, the second dry mass flow rate, the first amount of paper, and the second amount of paper.

The system that the controller can receive, from the first NIR device, a first type of paper in the wet paper material stream, receive, from the second NIR device, a second type of plastic in the wet plastic material stream, and modify the target paper/plastic ratio based on the first type of paper and the second type of plastic.

The system may be such that the controller can receive, from the first NIR device, a first type of contaminants in the contaminants.

The system may include a press configured to incorporate the combined stream into a finished product, and the controller can modify the target paper/plastic ratio based on one or more target attributes of the finished product.

The system controller may receive, from the first NIR device, a first spectral signature of the first type of paper in a spectrum spanning infrared and visible wavelengths, and receive, from the second NIR device, a second spectral signature of the second type of plastic in the spectrum spanning the infrared and visible wavelengths.

Figure 1:
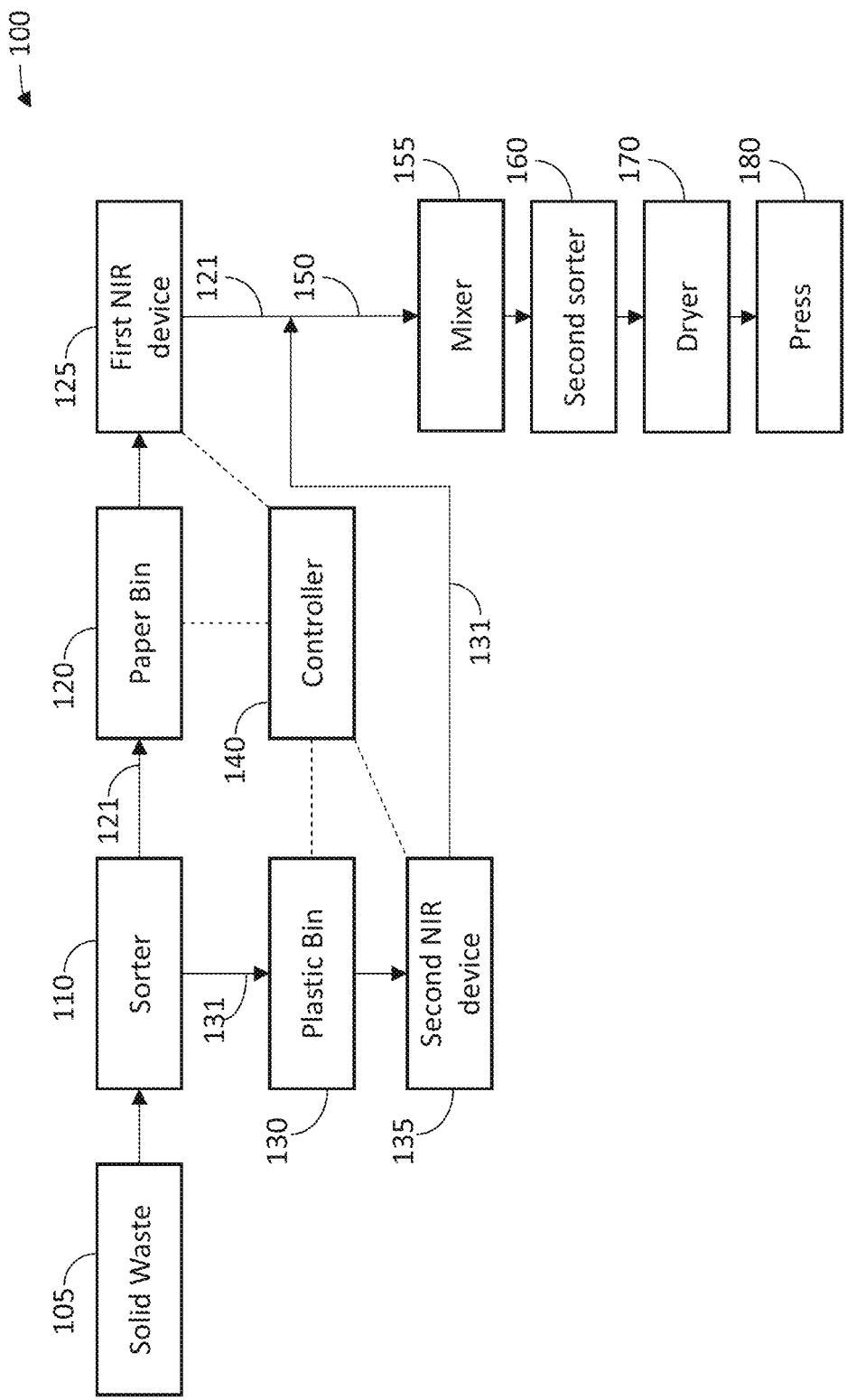
FIG. 1 is an example block diagram of a waste diversion system, in accordance with one or more embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The current disclosure solves the technical problem of adjusting a paper/plastic ratio in recycled material streams for producing a finished product. A first near-infrared (NIR) device may be used to determine a dry flow rate of a paper material stream harvested from solid waste and a second NIR device may be used to determine a dry flow rate of a plastic material stream harvested from solid waste. The determined dry flow rates allow a controller to adjust flow rates of the paper material stream and the plastic material stream to adjust a paper/plastic ratio of a combined stream. This allows the paper/plastic ratio to be determined and adjusted without drying the combined stream before determining the paper/plastic ratio, as in conventional systems.

This paper/plastic ratio can be used to produce finished products requiring the paper/plastic ratio. By adjusting the flow rates of wet material streams based on calculated dry flow rates, a precise paper/plastic ratio can be achieved in a wet combined stream, saving time, space, and money due to the elimination of extraneous dryers, storage bins, and flow gates. Adjusting the flow rates of wet material streams and measuring their moisture content also allows for the precise adjustment of moisture content in the combined stream and the finished product. The disclosed embodiments thus represent significant technical improvements over conventional systems.

Using NIR devices to determine the purity and moisture content of material streams provides the technical improvement of accurate calculations of dry flow rates of the material streams from wet flow rates. The NIR devices may determine an amount of contaminants in each material stream, refining a calculation of a desired material in each material stream. The NIR devices may also determine a moisture content of each material stream. Determining how much moisture and how much contaminant is in an impure, wet stream allows for accurate calculation of how much desired material is in the stream and what the flow rate of a dry, pure stream resulting from further sorting and drying. Accurately calculating the dry flow rate of the pure stream without actually drying and sorting the wet stream significantly cuts down on the time and cost of producing products with required material ratios from recycled materials.

FIG. 1 is an example block diagram of a waste diversion system 100, in accordance with one or more embodiments. The waste diversion system 100 may include a solid waste 105, a sorter 110, a paper bin 120, a first near-infrared (NIR) device 125, a plastic bin 130, a second NIR device, a controller 140, a combined stream 150, a mixer 155, a second sorter 160, a dryer 170, and a press 180.

The solid waste 105 may be municipal waste, industrial waste, household waste, black bin waste, blue bin waste, or any waste containing recyclable material. The sorter 110 may sort the solid waste 105 into a paper stream 121 which enters the paper bin 120 and a plastic stream 131 which enters the plastic bin 130. The sorter 110 may also sort out various other materials such as metal, glass, and other materials. In some embodiments, the sorter 110 may include a plurality of sub-sorters which sort out various materials. For example, the sorter 110 may include an eddy current sub-sorter for sorting out non-ferrous metals, a magnet sub-sorter for sorting out ferrous metals, and a screener sub-sorter for sorting out large items. In some embodiments, the solid waste is shredded before being sorted. In other embodiments, the solid waste is shredded after some materials, such as metals, have been sorted out. The solid waste may be raw, or untreated, and wet, meaning it has not been dried. Thus, the paper stream 121 and the plastic stream 131 may be wet.

The paper bin 120 may collect the paper stream 121 from the sorter 110. The paper bin 120 may store the paper stream 121. The paper bin 120 may include a first flow gate which controls a flow rate of the paper stream 121 from the paper bin 120. The plastic bin 130 may collect the plastic stream 131 from the sorter 110. The plastic bin 130 may store the plastic stream 131. The plastic bin 130 may include a second flow gate which controls a flow rate of the plastic stream 131 from the plastic bin 130.

The paper bin 120 and the plastic bin 130 may be controlled by the controller 140. The controller 140 may control the paper bin 120 to control the flow rate of the paper stream 121 and control the plastic bin 130 to control the flow rate of the plastic stream 131. The controller may control the first flow gate of the paper bin 120 to control the flow rate of the paper stream 121 and control the second flow gate of the plastic bin 130 to control the flow rate of the plastic stream 131. The controller 140 may control the flow rate of the paper stream 121 and the flow rate of the plastic stream 131 to control a paper/plastic ratio of a combined stream 150, as is discussed in greater detail below.

The first and second NIR devices 125, 135 may scan an electromagnetic spectrum including infrared and visible light. In some embodiments, the first and second NIR devices 125, 135 may take snapshots of the spectrum every 100 milliseconds or less. In some embodiments, the first and second NIR devices 125, 135 may compare spectral data of the snapshots to stored spectral data to determine characteristics of the paper stream 121 and plastic stream 131, as discussed herein.

The first NIR device 125 may determine a first amount of contaminants in the paper stream 121. The contaminants may be any material which is not paper. In some embodiments, the first NIR device 125 may determine a weight of the first amount of contaminants in the paper stream 121. For example, the first NIR device 125 may determine that the paper stream 121 is 95% pure, or that 95% of the material by weight in the paper stream is paper. In some embodiments, the first NIR device 125 may determine a mass flow rate of contaminants, or a portion of the total mass flow rate of the paper stream 121 due to contaminants. The first NIR device 125, or the controller, may determine the dry mass flow rate using equation 1.

Dry Mass Flow Rate (lbs/hr)=Wet Mass Flow Rate (lbs/hr)*Purity %*(1−Moisture Content %)  Equation 1:

For example, the first NIR device 125 may determine that of a mass flow rate of total material in the paper stream 121 of 100 pounds per hour, 5 pounds per hour is due to contaminants. The first NIR device 125 may determine a first moisture content of the paper stream 121. In some embodiments, the first NIR device 125 may determine the first moisture content of the paper stream 121 by weight. For example, the first NIR device 125 may determine that 10% of the weight of the materials in the paper stream 121 is due to moisture. In some embodiments, the first NIR device 125 may determine a mass flow rate of the moisture content or a portion of the total mass flow rate of the paper stream 121 due to contaminants. For example, the first NIR device 125 may determine that of a mass flow rate of total material in the paper stream 121 of 100 pounds per hour, 10 pounds per hour is due to contaminants.

The controller 140 may calculate a first dry mass flow rate of the paper stream 121 based on the first amount of contaminants, the first moisture content, and a first wet mass flow rate of the paper stream 121. For example, if 5% by weight of the first wet mass flow rate of the paper stream 121, also termed the flow rate of the paper stream 121, is due to the first amount of contaminants and 10% by weight is due to the first moisture content, then 85.5% of the flow rate of the first wet mass flow rate of the paper stream 121 is due to pure, dry paper. The controller 140 calculates, based on a final moisture content after drying of 5%, that the first dry mass flow rate of the paper stream 121 is equal to 90.5% of the first wet mass flow rate of the paper stream 121. In this example, if the first wet mass flow rate of the paper stream 121 is 100 pounds per hour, then the first dry mass flow rate of the paper stream 121 is 90.5 pounds per hour. This means that if the paper stream 121 were purified and dried, it would have a flow rate of 90.5 pounds per hour.

The second NIR device 135 may determine a second amount of contaminants in the plastic stream 131. The contaminants may be any material which is not plastic. In some embodiments, the second NIR device 135 may determine a weight of the second amount of contaminants in the plastic stream. For example, the second NIR device 135 may determine that the plastic stream 131 is 95% pure, or that 95% of the material by weight in the plastic stream 131 is plastic. In some embodiments, the second NIR device 135 may determine a mass flow rate of contaminants, or a portion of the total mass flow rate of the plastic stream 131 due to contaminants. For example, the second NIR device 135 may determine that of a mass flow rate of total material in the plastic stream 131 of 100 pounds per hour, 5 pounds per hour is due to contaminants. The second NIR device 135 may determine a second moisture content of the plastic stream 131. In some embodiments, the second NIR device 135 may determine the second moisture content of the plastic stream 131 by weight. For example, the second NIR device 135 may determine that 10% of the weight of the materials in the plastic stream 131 is due to moisture. In some embodiments, the second NIR device 135 may determine a mass flow rate of the moisture content or a portion of the total mass flow rate of the plastic stream 131 due to contaminants. For example, the second NIR device 135 may determine that of a mass flow rate of total material in the plastic stream 131 of 100 pounds per hour, 10 pounds per hour is due to contaminants.

The controller 140 may calculate a second dry mass flow rate of the plastic stream 131 based on the second amount of contaminants, the second moisture content, and a second wet mass flow rate of the plastic stream 131. For example, if 5% by weight of the second wet mass flow rate of the plastic stream 131, also termed the flow rate of the plastic stream 131, is due to the second amount of contaminants and 10% by weight is due to the second moisture content, then 85% of the flow rate of the second wet mass flow rate of the plastic stream 131 is due to pure, dry plastic. The controller 140 calculates, based on a final moisture content after drying of 5%, that the second dry mass flow rate of the plastic stream 131 is equal to 90% of the second wet mass flow rate of the plastic stream 131. In this example, if the second wet mass flow rate of the plastic stream 131 is 100 pounds per hour, then the second dry mass flow rate of the plastic stream 131 is 90 pounds per hour. This means that if the plastic stream 131 were purified and dried, it would have a flow rate of 90 pounds per hour.

The controller 140 may calculate, using the first dry mass flow rate and the second dry mass flow rate, a paper/plastic ratio of the combined stream 150. The controller 140 may calculate a wet mass flow rate of the combined stream 150, a portion of the wet mass flow rate of the combined stream 150 due to paper, and a portion of the wet mass flow rate of the combined stream 150 due to plastic. The controller 140 may calculate the paper plastic ratio of the combined stream 150 using the dry mass flow rates of the paper stream 121 and the plastic stream 131. For example, if the dry mass flow rate of the paper stream 121 is 100 pounds per hour and the dry mass flow rate of the plastic stream is 100 pounds per hour, then the paper/plastic ratio of the combined stream 150 is 1:1. The paper/plastic ratio of the combined stream 150 may be different from a ratio of the first wet mass flow rate of the paper stream 121 and the first wet mass flow rate of the plastic stream 131. The paper/plastic ratio of the combined stream 150 may be the same before and after sorting out contaminants from the combined stream 150 and drying the combined stream. Using the first dry mass flow rate of the paper stream 121 and the second dry mass flow rate of the plastic stream 131 allows for accurate calculation of portions of the dry mass flow rate of the combined stream 150 due to paper and plastic.

The controller 140 may be configured to control the paper bin 120 and the plastic bin 130 to control the first wet mass flow rate of the paper stream 121 and the second wet mass flow rate of the plastic stream 130 such that the calculated paper/plastic ratio of the combined stream 150 equals a target paper/plastic ratio. The target paper/plastic ratio may be a paper/plastic ratio required for producing a finished product using the combined stream 150.

In some embodiments, the first NIR device 125 determines a first type of paper in the paper stream 121. The first NIR device 125 may identify a first spectral signature of the first type of paper in a spectrum spanning infrared and visible wavelengths. In some embodiments, identifying the first spectral signature includes identifying an infrared spectral signature of the first type of paper in the infrared wavelengths, identifying a visible spectral signature of the first type of paper in the visible wavelengths, and combining the infrared and visible spectral signatures to identify the first spectral signature. The controller 140 may be configured to receive the first type of paper from the first NIR device 125. The controller 140 may be configured to modify the target paper/plastic ratio based on the first type of paper. The controller 140 may be configured to modify the target paper/plastic ratio based on a first amount of the first type of paper. The controller 140 may be configured to modify the target paper/plastic ratio based on one or more target attributes of the finished product. For example, the first NIR device 125 may identify cardboard in the paper stream 121. Cardboard has a higher percentage of virgin cellulose fibers than an average paper material, lending strength to the finished product. The controller may increase the paper/plastic ratio so the combined stream 150 contains more paper based on the cardboard providing increased strength to the finished product, of which one of the one or more target attributes is strength. The controller may be configured to modify the target paper/plastic ratio according to an amount of the first type of paper.

In some embodiments, the first NIR device 125 may determine a plurality of types of paper in the paper stream 121. The first NIR device 125 may determine an amount of each type of paper of the plurality of types of paper in the paper stream 121. The controller 140 may be configured to modify the target paper/plastic ratio according to the amounts of each type of paper of the plurality of types of paper in the paper stream 121. The controller 140 may be configured to modify the target paper/plastic ratio based on one or more target attributes of the finished product, according to the amounts of each type of paper of the plurality of types of paper in the paper stream 121. In some embodiments, the controller 140 may be configured to determine an average fiber strength of the plurality of types of paper in the paper stream 121.

In some embodiments, the second NIR device 135 determines a second type of plastic in the plastic stream 131. The second NIR device 135 may identify a second spectral signature of the second type of plastic in a spectrum spanning infrared and visible wavelengths. In some embodiments, identifying the second spectral signature includes identifying an infrared spectral signature of the second type of plastic in the infrared wavelengths, identifying a visible spectral signature of the second type of plastic in the visible wavelengths, and combining the infrared and visible spectral signatures to identify the second spectral signature. The controller 140 may be configured to receive the second type of plastic from the second NIR device 135. The controller 140 may be configured to modify the target paper/plastic ratio based on the second type of plastic. The controller 140 may be configured to modify the target paper/plastic ratio based on a second amount of the second type of plastic. The controller 140 may be configured to modify the target paper/plastic ratio based on one or more target attributes of the finished product. The controller may be configured to modify the target paper/plastic ratio according to an amount of the second type of plastic.

In some embodiments, the second NIR device 135 may determine a plurality of types of plastic in the plastic stream 131. The second NIR device 135 may determine an amount of each type of plastic of the plurality of types of plastic in the plastic stream 131. The controller 140 may be configured to modify the target paper/plastic ratio according to the amounts of each type of plastic of the plurality of types of plastic in the plastic stream 131. The controller 140 may be configured to modify the target paper/plastic ratio based on one or more target attributes of the finished product, according to the amounts of each type of plastic of the plurality of types of plastic in the plastic stream 131. In some embodiments, the controller 140 may be configured to determine an average fiber strength of the plurality of types of plastic in the plastic stream 131.

The controller 140 may be configured to modify the target paper/plastic ratio based on the first type of paper and the second type of plastic. The controller 140 may be configured to modify the target paper/plastic ratio based on the first amount of the first type of paper and the second amount of the second type of plastic. In some embodiments, the controller 140 may be configured to modify the target paper/plastic ratio based on the amounts of each type of paper and plastic of the plurality of types of paper and the plurality of types of plastic.

In some embodiments, the first NIR device 125 may be configured to determine a first type of contaminants in the paper stream 121. The first NIR device 125 may be configured to determine an amount of the first type of contaminant in the paper stream 121. The controller 140 may be configured to receive, from the first NIR device 125, the first type of contaminants and the amount of the first type of contaminants in the paper stream 121. In some embodiments, the first type of contaminant is plastic. The controller 140 may be configured to modify the calculated paper/plastic ratio of the combined stream 150 based on an amount of plastic in the paper stream 121. For example, the controller 140 may be configured to account for the amount of plastic in the paper stream 121 when calculating the paper/plastic ratio of the combined stream 150.

In some embodiments, the second NIR device 135 may be configured to determine a second type of contaminants in the plastic stream 131. The second NIR device 135 may be configured to determine an amount of the second type of contaminant in the plastic stream 131. The controller 140 may be configured to receive, from the second NIR device 135, the second type of contaminants and the amount of the second type of contaminants in the plastic stream 131. In some embodiments, the second type of contaminant is paper. The controller 140 may be configured to modify the calculated paper/plastic ratio of the combined stream 150 based on an amount of paper in the plastic stream 131. For example, the controller 140 may be configured to account for the amount of paper in the plastic stream 131 when calculating the paper/plastic ratio of the combined stream 150.

The controller 140 may be configured to modify the calculated paper/plastic ratio of the combined stream 150 based on an amount of plastic in the paper stream 121 and an amount of paper in the plastic stream 131.

In some embodiments, the controller 140 is a programmable logic controller (PLC). The controller 140, the paper bin 120, the plastic bin 130, the first NIR device 125, and the second NIR device 135 may form a control loop, with the controller 140 controlling the paper bin 120 and the plastic bin 130 based on input from the first NIR device 125 and the second NIR device 135. The controller 140 may receive, in real time, input from the first NIR device 125 and the second NIR device 135 and control, in real time, the paper bin 120 and the plastic bin 130.

The mixer 155 may be configured to mix the combined stream 150 such that the combined stream is a homogenous blend of paper and plastic of the target paper/plastic ratio. In some embodiments, the mixer 155 may be a blender, such as a drum blender.

The second sorter 160 may be configured to sort out contaminants from the combined stream 150. In some embodiments, the second sorter 160 may sort out contaminants from the combined stream 150 such that the combined stream comprises pure paper and plastic. In other embodiments, the second sorter 160 may sort out contaminants from the combined stream 150 such that the combined stream has a contaminant level below a threshold contaminant level of the finished product. In some embodiments, the waste diversion system 100 does not include the second sorter 160.

The dryer 170 may be configured to dry the combined stream 150. In some embodiments, the dryer 170 may dry the combined stream 150 for a set amount of time. In other embodiments, the dryer 170 may dry the combined stream 150 to achieve a particular moisture content of the combined stream. The finished product may require the moisture content to be within a particular range. The controller 140 may be configured to determine a target moisture content of the combined stream 150 based on one or more attributes of the finished product. The controller 140 may be configured to control the dryer 170 such that the dryer 170 dries the combined stream 150 to achieve the target moisture content in the combined stream 150.

The press 180 may be configured to incorporate the combined stream 150, when sorted and dried, into the finished product. The press 180 may use heat and pressure to consolidate the combined stream 150, or the paper and plastic of the combined stream 150 into the finished product. The finished product may require the target paper/plastic ratio. The controller 140 may be configured to control the paper/plastic ratio of the combined stream 150 based on one or more attributes of the finished product. The controller 140 may be configured to control the press 180 to consolidate the combined stream 150 into the finished product. In some embodiments, the controller may be configured to control the press 180 to account for the paper/plastic ratio and/or the moisture content of the combined stream 150. For example, the controller 140 cause the press 180 to heat the paper and plastic of the combined stream 150 for a longer amount of time based on the moisture content being higher than the target moisture content.

Figure 2:
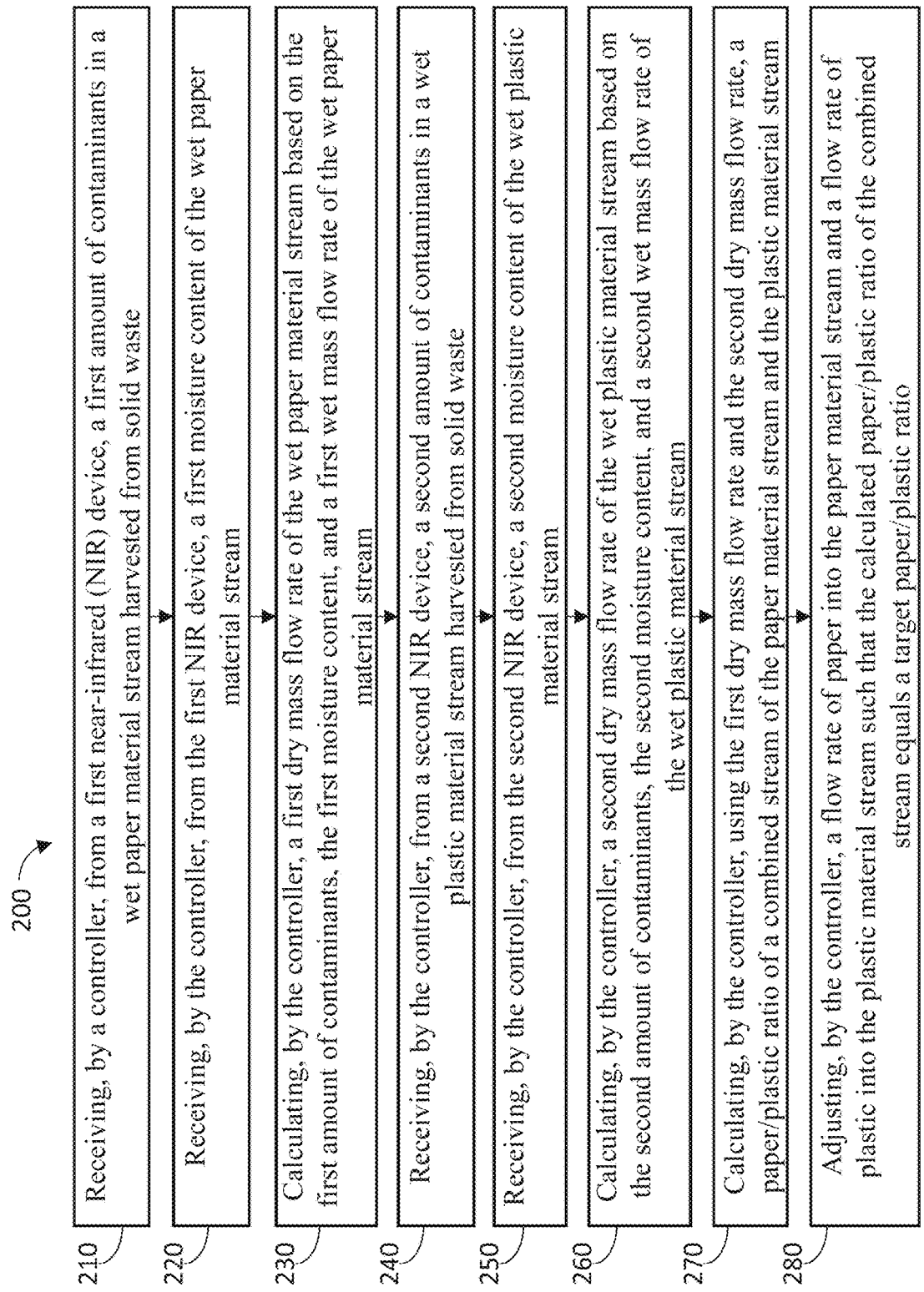
FIG. 2 is a flowchart illustrating operations for controlling a paper/plastic ratio in a combined materials stream, in accordance with one or more embodiments.

FIG. 2 is a flowchart 200 illustrating operations for controlling a paper/plastic ratio in a combined materials stream, in accordance with one or more embodiments. Additional, fewer, or different operations may be performed in the method, depending on the embodiment. Further, the operations may be performed in the order shown, concurrently, or in a different order. The operations of the flowchart 200 may be performed by the waste diversion system 100.

At 210, a controller receives, from a first NIR device, a first amount of contaminants in a wet paper material stream harvested from solid waste.

At 220, the controller receives, from the first NIR device, a first moisture content of the wet paper material stream.

At 230, the controller calculates a first dry mass flow rate of the wet paper material stream based on the first amount of contaminants, the first moisture content, and a first wet mass flow rate of the wet paper material stream.

At 240, the controller receives, from a second NIR device, a second amount of contaminants in a wet plastic material stream harvested from solid waste.

At 250, the controller receives, from the second NIR device, a second moisture content of the wet plastic material stream.

At 260, the controller calculates a second dry mass flow rate of the wet plastic material stream based on the second amount of contaminants, the second moisture content, and a second wet mass flow rate of the wet plastic material stream.

At 270, the controller calculates, using the first dry mass flow rate and the second dry mass flow rate, a paper/plastic ratio of a combined stream of the paper material stream and the plastic material stream.

At 280, the controller adjusts a flow rate of paper into the paper material stream and a flow rate of plastic into the plastic material bin such that the calculated paper/plastic ratio of the combined stream equals a target paper/plastic ratio.

Figure 3:
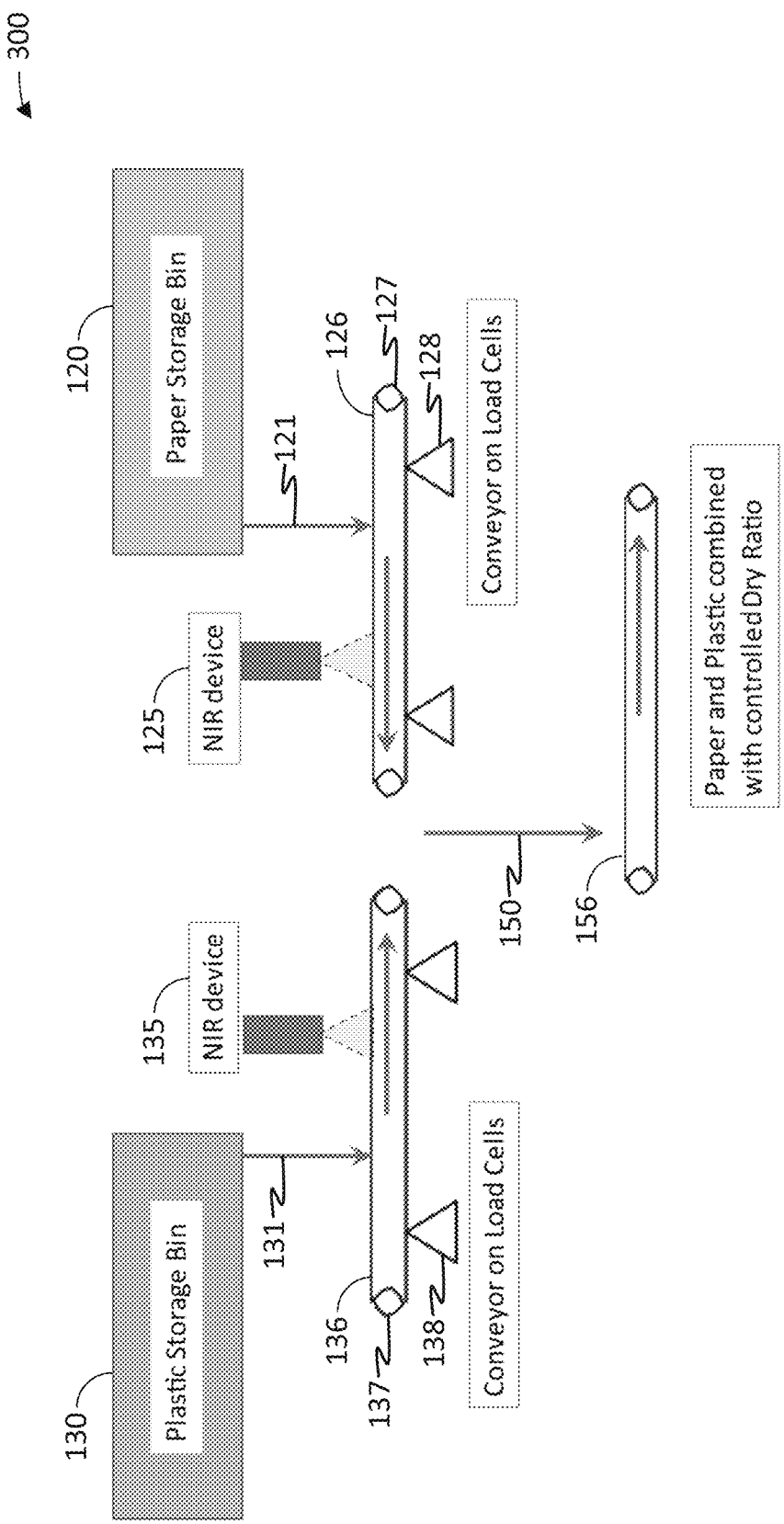
FIG. 3 illustrates an example flow adjustment system, in accordance with one or more embodiments.

FIG. 3 illustrates an example flow adjustment system 300, in accordance with one or more embodiments. Additional, fewer, or different operations may be performed in the method, depending on the embodiment. Further, the operations may be performed in the order shown, concurrently, or in a different order. The flow adjustment system 300 may be part of the waste diversion system 100 of FIG. 1. The flow adjustment system 300 may include the paper bin 120, the first NIR device 125, a first conveyor belt 126, a first speed sensor 127, a first load cell 128, the plastic bin 130, the second NIR device 135, a second conveyor belt 136, a second speed sensor 137, a second load cell 138, the combined stream 150, and a third conveyor 156. The controller 140 may control the paper bin 120 and the plastic bin 130 to control the paper stream 121 and the plastic stream 131 based on information from the first NIR device 125 and the second NIR device 135 to adjust the paper/plastic ratio and the moisture content of the combined stream 150, as discussed herein.

The first conveyor 126 may carry the paper stream 121 past the first NIR device 125 to the combined stream 150. The first speed sensor 127 may measure a speed of the first conveyor 126. The first load cell 128 may measure a weight of the paper stream 121 on the first conveyor 126. The controller 140 may be configured to receive, from the first speed sensor 127, the speed of the first conveyor 126. The controller 140 may be configured to receive, from the first load sensor 128, the weight of the paper stream 121 on the first conveyor 126. In some embodiments the first conveyor 126 may include multiple segments. The first speed sensor 127 may include multiple speed sensors. The first load cell 128 may include multiple load cells. In some embodiments, each segment of the multiple segments may include one or more speed sensors and load cells.

The controller 140 may be configured to calculate, using the speed of the first conveyor 126 and the weight of the paper stream 121 on the first conveyor 126, the first wet mass flow rate.

The second conveyor 136 may carry the plastic stream 131 past the second NIR device 135 to the combined stream 150. The second speed sensor 137 may measure a speed of the second conveyor 136. The second load cell 138 may measure a weight of the plastic stream 131 on the second conveyor 136. The controller 140 may be configured to receive, from the second speed sensor 137, the speed of the second conveyor 136. The controller 140 may be configured to receive, from the second load sensor 138, the weight of the plastic stream 131 on the second conveyor 136. In some embodiments, the second conveyor 136 may include multiple segments. The second speed sensor 137 may include multiple speed sensors. The second load cell 138 may include multiple load cells. In some embodiments, each segment of the multiple segments may include one or more speed sensors and load cells.

The controller 140 may be configured to calculate, using the speed of the second conveyor 136 and the weight of the plastic stream 131 on the second conveyor 136, the second wet mass flow rate.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a controller, from a first near-infrared (NIR) device, a first amount of contaminants in a wet paper material stream harvested from solid waste;
   receiving, by the controller, from the first NIR device, a first moisture content of the wet paper material stream;
   calculating, by the controller, a first dry mass flow rate of the wet paper material stream based on the first amount of contaminants, the first moisture content, and a first wet mass flow rate of the wet paper material stream;
   receiving, by the controller, from a second NIR device, a second amount of contaminants in a wet plastic material stream harvested from solid waste;
   receiving, by the controller, from the second NIR device, a second moisture content of the wet plastic material stream;

calculating, by the controller, a second dry mass flow rate of the wet plastic material stream based on the second amount of contaminants, the second moisture content, and a second wet mass flow rate of the wet plastic material stream;

calculating, by the controller, using the first dry mass flow rate and the second dry mass flow rate, a paper/plastic ratio of a combined stream of the paper material stream and the plastic material stream; and adjusting, by the controller, a flow rate of paper into the paper material stream and a flow rate of plastic into the plastic material stream such that the calculated paper/plastic ratio of the combined stream equals a target paper/plastic ratio.

2. The method of claim 1, further comprising sorting the combined stream to remove contaminants from the combined stream.

3. The method of claim 2, further comprising drying the combined stream.

4. The method of claim 3, further comprising incorporating the combined stream into a finished product having the target paper/plastic ratio.

5. The method of claim 3, further comprising determining, by the controller, a target moisture content of the combined stream, and wherein drying the combined stream comprises drying the combined stream to achieve the target moisture content.

6. The method of claim 3, further comprising:
determining, using the first NIR device, a first type of contaminants in the contaminants.

7. The method of claim 1, further comprising:
determining, using the first NIR device, a first amount of plastic in the wet paper material stream;
determining, using the second NIR device, a second amount of paper in the wet plastic material stream, and
wherein calculating the paper/plastic ratio of the combined stream comprises calculating the paper/plastic ratio of the combined stream using the first dry mass flow rate, the second dry mass flow rate, the first amount of paper, and the second amount of paper.

8. The method of claim 1, further comprising:
determining, using the first NIR device, a first type of paper in the wet paper material stream;
determining, using the second NIR device, a second type of plastic in the wet plastic material stream; and
modifying the target paper/plastic ratio based on the first type of paper and the second type of plastic.

9. The method of claim 8, further comprising incorporating the combined stream into a finished product, wherein modifying the target paper/plastic ratio comprises modifying the target paper/plastic ratio based on one or more target attributes of the finished product.

10. The method of claim 8, wherein determining the first type of paper using the first NIR device comprises identifying, by the first NIR device, a first spectral signature of the first type of paper in a spectrum spanning infrared and visible wavelengths, and
wherein determining the second type of paper using the second NIR device comprises, identifying, by the second NIR device, a second spectral signature of the second type of plastic in the spectrum spanning the infrared and visible wavelengths.

11. A system comprising:
a controller configured to:
receive, from a first near-infrared (NIR) device, a first amount of contaminants in a wet paper material stream harvested from solid waste;
receive, from the first NIR device, a first moisture content of the wet paper material stream;
calculate a first dry mass flow rate of the wet paper material stream based on the first amount of contaminants, the first moisture content, and a first wet mass flow rate of the wet paper material stream;
receive, from a second NIR device, a second amount of contaminants in a wet plastic material stream harvested from solid waste;
receive, from the second NIR device, a second moisture content of the wet plastic material stream;
calculate a second dry mass flow rate of the wet plastic material stream based on the second amount of contaminants, the second moisture content, and a second wet mass flow rate of the wet plastic material stream;
calculate, using the first dry mass flow rate and the second dry mass flow rate, a paper/plastic ratio of a combined stream of the paper material stream and the plastic material stream; and
adjust the first wet mass flow rate of the paper material stream and the second wet mass flow rate of the plastic material stream such that the calculated paper/plastic ratio of the combined stream equals a target paper/plastic ratio.

12. The system of claim 11, further comprising a sorter configured to sort the combined stream to remove contaminants from the combined stream.

13. The system of claim 12, further comprising a dryer configured to dry the combined stream.

14. The system of claim 13, further comprising a press configured to incorporate the combined stream into a finished product having the target paper/plastic ratio.

15. The system of claim 13, wherein the controller is further configured to determine a target moisture content of the combined stream, and wherein drying the combined stream comprises drying the combined stream to achieve the target moisture content.

16. The system of claim 13, wherein the controller is further configured to: receive, from the first NIR device, a first type of contaminants in the contaminants.

17. The system of claim 11, wherein the controller is further configured to:
receive, from the first NIR device, a first amount of plastic in the wet paper material stream;
receive, from the second NIR device, a second amount of paper in the wet plastic material stream, and
calculate the paper/plastic ratio of the combined stream using the first dry mass flow rate, the second dry mass flow rate, the first amount of paper, and the second amount of paper.

18. The system of claim 11, wherein the controller is further configured to:
receive, from the first NIR device, a first type of paper in the wet paper material stream;
receive, from the second NIR device, a second type of plastic in the wet plastic material stream; and
modify the target paper/plastic ratio based on the first type of paper and the second type of plastic.

19. The system of claim 18, further comprising a press configured to incorporate the combined stream into a finished product, and wherein the controller is further configured to modify the target paper/plastic ratio based on one or more target attributes of the finished product.

20. The system of claim 18, wherein receiving the first type of paper from the first NIR device comprises receiving, from the first NIR device, a first spectral signature of the first type of paper in a spectrum spanning infrared and visible wavelengths, and wherein receiving the second type of paper from the second NIR device comprises, receiving, from the second NIR device, a second spectral signature of the second type of plastic in the spectrum spanning the infrared and visible wavelengths.

\* \* \* \* \*